May 1, 1945.　　　　B. W. KING　　　　2,374,866
VARIABLE SPEED CLUTCH
Filed Jan. 30, 1942　　　　2 Sheets-Sheet 1
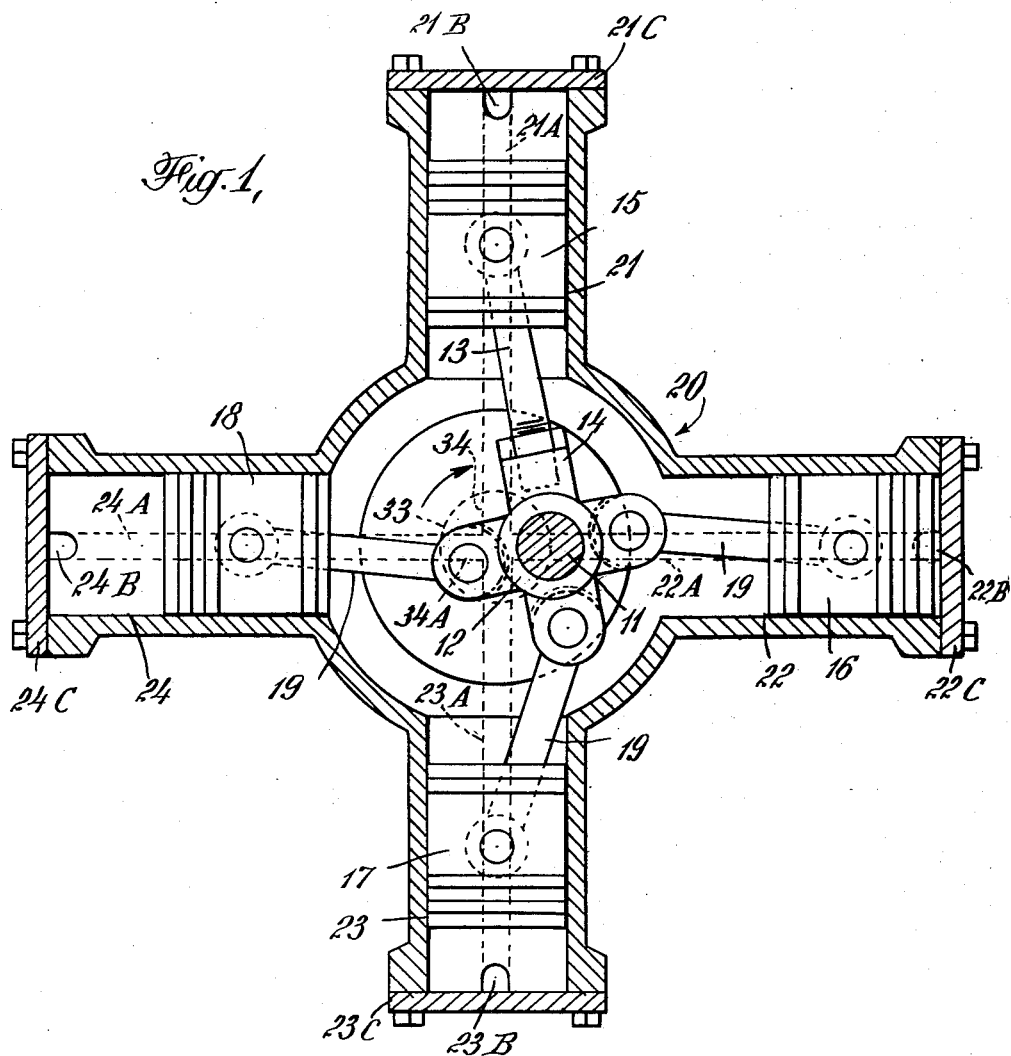
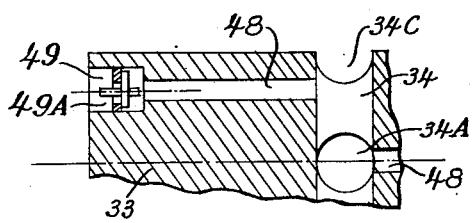
INVENTOR
Bertell W. King
BY
ATTORNEYS

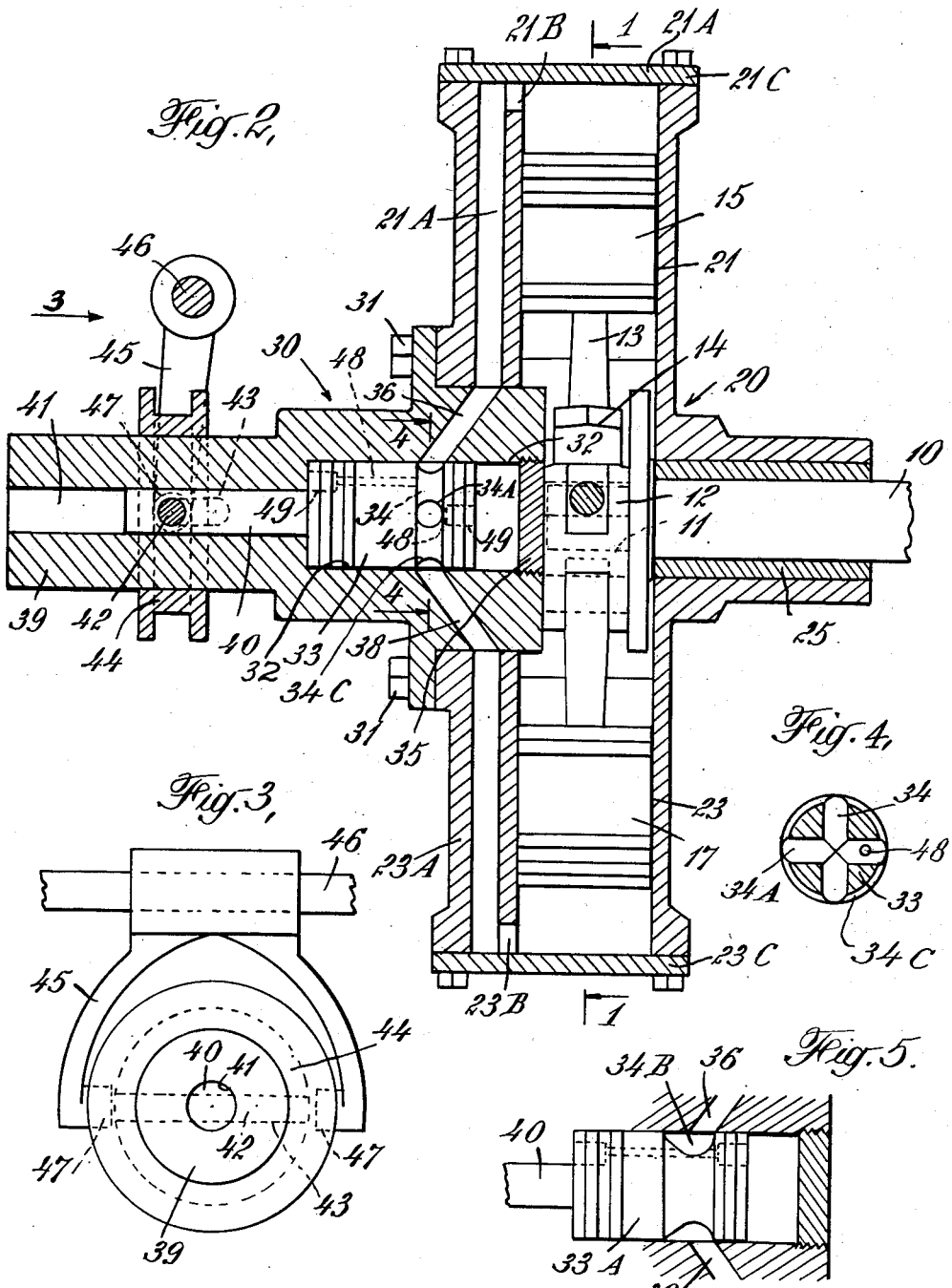

Patented May 1, 1945

2,374,866

UNITED STATES PATENT OFFICE 2,374,866

VARIABLE-SPEED CLUTCH

Bertell W. King, Brooklyn, N. Y.

Application January 30, 1942, Serial No. 428,805

1 Claim. (Cl. 192—60)

This invention relates to improvements in variable speed clutches, and its object is to provide a simple clutch of the type in which a driving shaft is coupled to a driven shaft through the interposition of a body of oil or other liquid and disconnected by a controlled circulation of the liquid. This principle has been utilized by others by the use of complicated mechanisms of doubtful effectiveness. The object of my invention is to simplify the construction of mechanisms which utilize the aforesaid principle and to provide an inexpensive and easily controlled device of great efficiency and to overcome the objectionable features of such mechanisms as have been available heretofore.

Other objects of the invention will appear in the following specification in which I will describe a preferred embodiment of my invention, the novel features of which will be set forth in appended claim.

Referring to the drawings,

Fig. 1 is a sectional end elevation of a clutch which is made according to and embodies the present invention;

Fig. 2 is a sectional side elevation of the clutch shown in Fig. 1. The section shown in Fig. 1 is taken on the line 1—1 of Fig. 2;

Fig. 3 is an end view of some of the parts shown in Fig. 2, the view being taken in the direction indicated by the arrow 3 in the latter figure;

Fig. 4 is a sectional end elevation of the control valve shown in Fig. 2, the section being taken on the line 4—4 of the latter figure; and Fig. 5 is a side elevation partly in section and on a larger scale of a control valve of modified construction.

Fig. 6 is a transverse section on an enlarged scale of a part of the control valve shown in Fig. 2.

10 designates a shaft having an eccentric crank pin 11 on one of its ends. 12 is a collar pivotally mounted on the crank pin. One end of a connecting rod 13 is rigidly affixed to the collar 12, as at 14, with its other end pivotally connected with a piston 15 in a cylinder 21. The cylinder 21 is formed in a casing 20 which will be described presently, and extends at right angles from the axis of shaft 10. By this arrangement any movement of the piston 15 will change the angular position of the collar 12 on the crank pin 11. 16, 17 and 18 are similar pistons in other radially disposed cylinders 22, 23 and 24 formed in the casing 20, angularly spaced from cylinder 21 and from each other. These pistons are connected with the collar 12 by connecting rods such as 19, pivotally connected near their ends with both the pistons and the collar 12. It is obvious that if the casing 20 is stationary, rotation of shaft 10 will cause the pistons 15, 16, 17 and 18 to reciprocate in their respective cylinders.

As may be seen from Fig. 2, the casing 20 is rotatably mounted on a bushing 25 on the drive shaft 10. Back of each cylinder a passage is formed in the casing 20, such as those shown at 21A, 22A, 23A and 24A. These passages open into the outer ends of the respective cylinders through ports 21B, 22B, 23B and 24B which are closed at their ends by heads 21C, 22C, 23C and 24C which also close the outer ends of the cylinders.

30 designates a cylindrical valve block in axial alinement with shaft 10 affixed to the casing 20 by bolts 31. 32 is a cylindrical valve chamber within which is a longitudinally movable piston valve 33 having intermediate its ends a transverse passage 34 interconnecting the passages 36 and 38 and another transverse passage 34A interconnecting the passages which are alined with the cylinder passages 22A and 24A. One end of this valve chamber is closed by a cap 35. The block 30 is provided with passages, such as 36, 38, which register with the cylinder communicating passages 21A, 22A, 23A and 24A.

From the other end of valve 33 a stem 40 extends into a hollow opening 41 in a cylindrical extension 39 of the block 30. 42 is a pin which extends transversely from the valve stem 40 through slots 43 in the extension 39 into a grooved collar 44 slidably mounted on the block extension 39. 45 is a lever affixed to a rock shaft 46, the axis of which is normal to the axis of shaft 10 and of block 30. This lever has bifurcated arms from which pins 47 project into the groove in collar 44. By this arrangement the valve 33 may be moved longitudinally and its position controlled.

The crank case, outer ends of the cylinders and the ports and passages connected with them are filled with oil or other suitable liquid. The outward movement of piston 15 will force oil out of its cylinder 21 and as piston 17 is at that time moving in the opposite direction it will draw oil into its cylinder 23. When valve 33 is in the position in which it is shown in Fig. 2, the outer ends of cylinders 15 and 17 are interconnected by passages 21A, 34, 38 and 23A so that oil may circulate freely between them. Similarly, the outer ends of cylinders 22 and 24 are interconnected by passages 23A, 34A and 24A. An annular groove 34C in the valve also connects all of the cylinders.

When valve 33 is moved to the right it will close the connections between passages 36, 38 and similar passages between cylinder passages 22A and 24A and the oil circulation will be arrested. This in turn will arrest the movement of the pistons 21, 22, 23 and 24 and the rotation of drive shaft 10 will be imparted to the casing 20 and the block 30 through crank pin 11, collar 12 and the connecting rods, such as 13 and 19. The casing 20 and block 30 thus become a driven member and rotate in unison with drive shaft 10.

Retardation of the oil circulation may be effected to different degrees by moving valve 33 to intermediate positions. This will result in the casing and block being driven at a lower speed than that of shaft 10 and the amount of this difference in speed can be controlled to a great nicety.

48 and 49 are longitudinal passages through the valve 33 and are fitted with check valves 49A to permit any accumulation of oil at the ends of the valve chamber 32 to be forced by the movement of the valve into the central passages of the valve and thus prevent it from interfering with the movement of the valve.

In the arrangement shown in Fig. 5, the valve 33A is provided with an annular groove 34B of irregular cross-sectional area. With the valve in its extreme left hand position, as shown, all of the cylinders are connected together by a valve passage of maximum capacity which may be diminished gradually by moving the valve to the right. When this valve is moved to its extreme right hand position it will stop the oil circulation entirely.

This clutch may be used for the transmission of power in almost innumerable mechanical installations such, for example, as for driving machine tools, hoists, pumps, propellor shafts of vessels, airplanes or vehicles, in fact in almost any organization where a variable speed or a combination of a variable speed and a clutch is desired or necessary.

Structural variations may be made within the spirit and scope of this invention and I intend no limitations other than those imposed by the appended claim.

What I claim is:

A fluid clutch comprising a drive shaft, an eccentric axle thereon, a collar pivotally mounted on said axle, a casing rotably supported on the drive shaft, said casing forming a pair of oppositely disposed cylinders radially disposed in relation to the axis of the drive shaft, a piston in each cylinder, a rod rigidly affixed to said collar with its outer end pivotally connected with the piston in one of said cylinders, a piston rod pivotally connected with the collar and with the piston in the other cylinder, a valve block affixed to said casing constructed to form a longitudinally disposed chamber in axial alinement with the drive shaft, passages formed in the casing interconnecting the outer ends of the radially disposed cylinders with said chamber, a longitudinally movable valve in the chamber for controlling said passages, a transverse passage through said valve, and check controlled longitudinal passages in the valve interconnecting the ends of the chamber with the transverse passage in the valve.

BERTELL W. KING.